United States Patent
Zhang et al.

(10) Patent No.: US 9,648,342 B2
(45) Date of Patent: May 9, 2017

(54) METHOD AND APPARATUS FOR RESIDUAL PREDICTION IN THREE-DIMENSIONAL VIDEO CODING

(71) Applicant: HFI INNOVATION INC., Zhubei, Hsinchu County (TW)

(72) Inventors: Kai Zhang, Beijing (CN); Jicheng An, Beijing (CN); Jian-Liang Lin, Su'ao Township Yilan County (TW)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 189 days.

(21) Appl. No.: 14/442,951

(22) PCT Filed: Nov. 14, 2013

(86) PCT No.: PCT/CN2013/087117
§ 371 (c)(1),
(2) Date: May 14, 2015

(87) PCT Pub. No.: WO2014/075615
PCT Pub. Date: May 22, 2014

(65) Prior Publication Data
US 2015/0341663 A1     Nov. 26, 2015

(30) Foreign Application Priority Data

Nov. 14, 2012 (WO) ................ PCT/CN2012/084580

(51) Int. Cl.
*H04N 19/597*     (2014.01)
*H04N 19/52*      (2014.01)
(Continued)

(52) U.S. Cl.
CPC ............. *H04N 19/52* (2014.11); *H04N 19/14* (2014.11); *H04N 19/172* (2014.11);
(Continued)

(58) Field of Classification Search
CPC .................................................... H04N 19/597
(Continued)

(56) References Cited

U.S. PATENT DOCUMENTS 6,999,513 B2 * 2/2006 Sohn .................... H04N 19/597
                                                    348/E13.062
8,451,894 B2   5/2013 Tanimoto et al.
(Continued)

FOREIGN PATENT DOCUMENTS

CN        101222627       7/2008
CN        101243692       8/2008
(Continued)

OTHER PUBLICATIONS

WG 3—3D Video Coding Extension Development; Jul. 20, 2012.*
(Continued)

*Primary Examiner* — William C Vaughn, Jr.
*Assistant Examiner* — Luis Perez Fuentes
(74) *Attorney, Agent, or Firm* — McClure, Qualey & Rodack, LLP

(57) ABSTRACT

A method and apparatus using pseudo residues to predict current residues for three-dimensional or multi-view video coding are disclosed. The method first receives input data associated with a current block of a current picture in a current dependent view and determines an inter-view reference block in a first inter-view reference picture in a reference view according to a DV (disparity vector), where the current picture and the first inter-view reference picture correspond to same time instance. Pseudo residues are then determined and used for encoding or decoding of the current block, where the pseudo residues correspond to differences between a corresponding region in an inter-time reference picture in the current dependent view and a pseudo reference region in a pseudo reference picture in the reference view, (Continued)

and where the inter-time reference picture and the pseudo reference picture correspond to same time instance.

16 Claims, 13 Drawing Sheets

(51) Int. Cl.
*H04N 19/176* (2014.01)
*H04N 19/14* (2014.01)
*H04N 19/172* (2014.01)
*H04N 19/174* (2014.01)

(52) U.S. Cl.
CPC ......... *H04N 19/174* (2014.11); *H04N 19/176* (2014.11); *H04N 19/597* (2014.11)

(58) Field of Classification Search
USPC .................................................... 375/240.16
See application file for complete search history.

(56) References Cited

U.S. PATENT DOCUMENTS

| | | | |
|---|---|---|---|
| 9,088,797 B2* | 7/2015 | Zhang | H04N 19/51 |
| 9,118,897 B2* | 8/2015 | Wiegand | H04N 13/0011 |
| 2003/0202592 A1 | 10/2003 | Sohn et al. | |
| 2007/0041443 A1 | 2/2007 | Ha et al. | |
| 2008/0170618 A1 | 7/2008 | Choi et al. | |
| 2015/0124877 A1* | 5/2015 | Choi | H04N 19/597 375/240.12 |
| 2015/0201214 A1* | 7/2015 | Lin | H04N 19/597 348/42 |
| 2015/0215640 A1 | 7/2015 | Lin | |

FOREIGN PATENT DOCUMENTS

| | | |
|---|---|---|
| CN | 101361371 | 2/2009 |
| CN | 101601304 | 12/2009 |
| CN | 102946536 | 2/2013 |
| JP | 7-240944 | 9/1995 |
| KR | 1020120095610 | 8/2012 |
| WO | WO 2014/205343 | 12/2014 |

OTHER PUBLICATIONS

WP 3—3D Video Coding Extension Development; Oct. 19, 2012.*
Google Patent search history.*
IEEE Xplore search history.*
International Search Report dated Feb. 20, 2014, issued in PCT/CN2013/087117.
Heribert, B., et.al,; "Multiview Extension of HEVC Using Reduced Resolution Disparity Information for Inter-View Prediction Tools;" pp. 1-4.
Zhang, L., et al.; "CE4: Advanced residual prediction for multiview coding;" Joint Collaborative Team on 3D Video Coding Extensions of ITU-T SG 16 WP 3 and ISO/IEC JTC 1/SC 29/WG 11; Apr. 2013; pp. 1-9.
Francois, E., et al.; "SCE3: Experiment 3.5 on Simplification of Generalized Residual Inter-Layer Prediction for spatial scalability;" Joint Collaborative Team on Video Coding (JCT-VC) of ITU-T SG 16 WP 3 and ISO/IEC JTC 1/SC 29/WG 11; Apr. 2013; pp. 1-8.
Zhang, N., et al.; "3D-CE2.h related: Improved DV searching order;" Joint Collaborative Team on 3D Video Coding Extensions of ITU-T SG 16 WP 3 and ISO/IEC JTC 1/SC 29/WG 11; Jan. 2013; pp. 1-4.
Itani, Y., et al.; "Improvement to AMVP/Merge process;" Joint Collaborative Team on Video Coding (JCT-VC) of ITU-T SG 16 WP 3 and ISO/IEC JTC 1/SC 29/WG 11; Mar. 2011; pp. 1-8.
Zhang, et al.; "3D-CE4: Advanced residual prediction for multiview coding;" Joint Collaborative Team on 3D Video Coding Extensions of ITU-TSG 16 WP 3 and ISO/IEC JTC 1/SC 29/WG 11; Jan. 2013; pp. 1-6.
An, J., et al.; "3D-CE3.h related: Advanced temporal residual prediction;" Joint Collaborative Team on 3D Video Coding Extensions of ITU-T SG 16 WP 3 and ISO/IEC JTC 1/SC 29/WG 11; Jul. 2013; pp. 1-4.
Zhang, K., et al.; "3D-CE4: Results on improved advanced residual prediction;" Joint Collaborative Team on 3D Video Coding Extensions of ITU-T SG 16 WP 3 and ISO/IEC JTC 1/SC 29/WG 11; Oct. 2013; pp. 1-6.

* cited by examiner

METHOD AND APPARATUS FOR RESIDUAL PREDICTION IN THREE-DIMENSIONAL VIDEO CODING

CROSS REFERENCE TO RELATED APPLICATIONS

The present invention is a National Phase of PCT Application, Serial No. PCT/CN2013/087117, filed on Nov. 14, 2013, which claims priority to PCT Patent Application, Serial No. PCT/CN2012/084580, filed on Nov. 14, 2012, entitled "Methods for Residual Prediction with Pseudo Residues in 3D Vid". The PCT Patent Applications are hereby incorporated by reference in their entirety.

TECHNICAL FIELD

The present invention relates to three-dimensional and multi-dimensional video coding. In particular, the present invention relates to video coding using inter-view residual prediction.

BACKGROUND

Three-dimensional (3D) television has been a technology trend in recent years that intends to bring viewers sensational viewing experience. Various technologies have been developed to enable 3D viewing. The multi-view video is a key technology for 3DTV application among others. The traditional video is a two-dimensional (2D) medium that only provides viewers a single view of a scene from the perspective of the camera. However, the multi-view video is capable of offering arbitrary viewpoints of dynamic scenes and provides viewers the sensation of realism. 3D video formats may also include depth maps associated with corresponding texture pictures. The depth maps also have to be coded to rendering three-dimensional view or multi-view.

Various techniques to improve the coding efficiency of 3D video coding have been disclosed in the field. There are also development activities to standardize the coding techniques. For example, a working group, ISO/IEC JTC1/SC29/WG11 within ISO (International Organization for Standardization) is developing an HEVC (High Efficiency Video Coding) based 3D video coding standard (named 3D-HEVC). To reduce the inter-view redundancy, a technique, called disparity-compensated prediction (DCP) has been added as an alternative coding tool to motion-compensated prediction (MCP). MCP is also referred as Inter picture prediction that uses previously coded pictures of the same view in a different access unit (AU), while DCP refers to an Inter picture prediction that uses already coded pictures of other views in the same access unit, as shown in FIG. 1.

The video pictures and depth maps corresponding to a particular camera position are indicated by a view identifier (i.e., V0, V1 and V2 in FIG. 1). All video pictures and depth maps that belong to the same camera position are associated with a same viewID. The view identifiers are used for specifying the coding order inside the access units and detecting missing views in error-prone environments. Within an access unit (e.g., access unit 110), the video picture (112) and the associated depth map, if present, with viewID equal to 0 are coded first. The video picture and the depth map associated with viewID equal to 0 are followed by the video picture (114) and depth map with viewID equal to 1, the video picture (116) and depth map with viewID equal to 2 and so on. The view with viewID equal to 0 (i.e., V0 in FIG. 1) is also referred to as the base view or the independent view. The base view is independently coded using a conventional HEVC video coder without the need of any depth map and without the need of video pictures from any other view.

As shown in FIG. 1, motion vector predictor (MVP)/disparity vector predictor (DVP) can be derived from the inter-view blocks in the inter-view pictures for the current block. In the following, "inter-view blocks in inter-view picture" may be abbreviated as "inter-view blocks" and the derived candidate is termed as inter-view candidates (i.e., inter-view MVPs/DVPs). Moreover, a corresponding block in a neighboring view, also termed as an inter-view collocated block, is determined by using the disparity vector derived from the depth information of the current block in the current picture. For example, current block 126 in current picture 116 in view V2 is being processed. Block 122 and block 124 are located in the inter-view collocated pictures 0 and 1 (i.e., 112 and 114) respectively at the corresponding location of current block 126. Corresponding blocks 132 and 134 (i.e., inter-view collocated blocks) in the inter-view collocated pictures 0 and 1 (i.e., 112 and 114) can be determined by the disparity vectors 142 and 144 respectively.

In 3D-HEVC, inter-view residual prediction (IVRP) has been developed as a new coding tool in order to share the previously encoded residual information of reference views. The basic principle of the inter-view residual prediction is illustrated in FIG. 2. The inter-view residual prediction is based on a Disparity Vector (DV) derived for the current block (i.e., Prediction Unit, PU). The DV can be derived from the spatial or temporal neighboring blocks of the current block according to 3D-HEVC. Alternatively, a disparity derivation technique based on Motion Compensated prediction (MCP), named DV-MCP, can also be used to derive an estimated DV. In this case, blocks coded by MCP are also for the disparity derivation process. When a neighboring block is an MCP coded block and its motion is predicted by interview motion prediction, the disparity vector used for the inter-view motion prediction represents a motion correspondence between the current and the inter-view reference picture. The blocks are referred to as DV-MCP.

FIG. 2 illustrates the process of inter-view residual prediction. As shown in FIG. 2, current PU 222 of current picture 220 in a dependent view (e.g., view 1, V1) is a block to be coded. The mapping from current block 222 to corresponding block 212 based on the derived disparity vector is indicated by the dashed arrow (240). In other words, the derived disparity vector is used to located corresponding block 212 in reference-view picture 210 (i.e., view 0, V0). The reference-view picture (210) has been already coded when the current block (222) is encoded. Therefore, residual picture (230) for the reference-view picture (210) is available. A residual block (232) at the corresponding location of block 212 is then used as inter-view residual predictor for the current block (222).

The derivation of the location of reference residual block of IVRP is shown in FIG. 3. Pixel location 310 is located in block 222 in the current view and block 222 (i.e., a prediction unit, PU) is identified by its upper left corner pixel (320). The corresponding block (212) in the reference view (V0) is identified by first locating respective location 330 in the reference view (V0) corresponding to upper left corner location 320 of block 222 in the current view (V1). The DV (350) is then used to locate the corresponding upper left corner location 340 of the reference block (212) in the reference view. Accordingly, the reference block (212) in the reference view is identified. A corresponding location in the residual picture is identified as the corresponding residual block. This residual block of the reference picture is used as the predictor for a residual block of the current block in the reference view. If the disparity vector points to a sub-sample location, the residual prediction signal is obtained by interpolating the residual samples of the reference view using a bi-linear filter.

The usage of the inter-view residual prediction can be adaptively controlled at the prediction unit (PU) level. An IVRP On/Off control flag is signaled as part of the coding unit (CU) syntax when all the following conditions are true:
1. The current CU is a texture CU in a dependent view and the current slice is not an I-slice.
2. The current CU has at least one PU using motion-compensated prediction.
3. One or more transform units (TUs) covered or partially covered by the reference block in the reference view are non-Intra coded and contain at least one nonzero coded block flag (CBF).

If the IVRP On/Off control flag is signaled as 0 or not signaled for a CU, the IVRP is Off for the CU. In other words, the residual of the CU is conventionally coded using the HEVC transform coding. Otherwise, if the IVRP On/Off flag is signaled as 1 for a CU, then each PU in the CU will determine whether to use the IVRP or not according to the reference picture type as follows:
1. If a PU only uses motion-compensated prediction, the IVRP is enabled for the PU.
2. If a PU only uses disparity-compensated prediction, the IVRP is disabled for the PU.
3. If the current PU is bi-prediction and one direction is motion compensated prediction and the other direction is disparity-compensated prediction, the IVRP is enabled. However, the reference residual used in IVRP is multiplied by ½.

For 3D-HEVC, an advanced residual prediction (ARP) method is proposed to improve the efficiency of IVRP, where the motion of a current view is applied to the corresponding block in a reference view. Furthermore, an additional weighting factor is introduced to compensate the quality difference between different views. FIG. 4 illustrates the prediction structure of ARP in multi-view video coding. As shown in FIG. 4, block 410 represents the current block in the current view (view 1), block 420 and block 430 correspond to the representation of the current block (410) in the reference view (view 0) at time Tj and the temporal prediction of the current block (410) from the same view (view 1) at time Ti respectively. Motion vector 450 corresponds to the motion from block 410 to block 430 of view 1. Since block 410 and block 420 are actually projections of the same object in two different views, these two blocks should share the same motion information. Therefore, the reference block (440) corresponding to the temporal prediction in view 0 at time Ti for block 420 can be located from block 420 by applying motion information (460), which is the same as motion vector 450. The residues of block 420 using motion information 440 are then multiplied by a weighting factor and used as the residual predictor for current residues of block 410.

The main procedures of the ARP at the decoder side is described as follows:
1. Obtain an estimated disparity vector according to 3D-HEVC, where the estimated disparity vector points to a target reference view. The corresponding block in the referenced picture of the reference view within the same access unit is located by the estimated disparity vector.
2. Re-use the motion information of the current block to derive the motion information for the reference block in the reference view. Apply motion compensation to the corresponding block (i.e., the reference block in the reference view) based on the same motion vector of current block and the derived reference picture in the reference view for the reference block to derive a residue block for the corresponding block. The relationship among current block, corresponding block and motion compensated block is shown in FIG. 5. The reference picture in the reference view ($V_0$) which has the same POC (Picture Order Count) value as the reference picture of current view ($V_m$) is selected as the reference picture of the corresponding block. Disparity vector (516) is the estimated DV for the current block (520) in view $V_m$ to locate the corresponding block (510) in the reference view ($V_0$). The current block 520 has motion vector 522 pointing to list0 refidx0 in $V_m$ which can be reused by the corresponding block (510). Motion compensation can be applied to the corresponding block (510) based on the same motion vector (i.e., 522) of current block 520 to derive residue block 512.
3. Apply a weighting factor to the residue block to get a weighted residue block and add the values of the weighted residue block to the predicted samples.

Three weighting factors are used in ARP, i.e., 0, 0.5 and 1. The one leading to minimal rate-distortion cost for the current CU is selected as the final weighting factor and the corresponding weighting index (0, 1 and 2 which correspond to weighting factor 0, 1, and 0.5, respectively) is transmitted in the bitstream at the CU level. All PU predictions in one CU share the same weighting factor. When the weighting factor is equal to 0, ARP is not used for the current CU.

SUMMARY

A method and apparatus for three-dimensional or multi-view video coding are disclosed. The method first receives input data associated with a current block of a current picture in a current dependent view and determines an inter-view reference block in a first inter-view reference picture in a reference view according to a DV (disparity vector), where the current picture and the first inter-view reference picture correspond to same time instance or same access unit. Pseudo residues are then determined and used for encoding or decoding of the current block, where the pseudo residues correspond to differences between a corresponding region in an inter-time reference picture in the current dependent view and a pseudo reference region in a pseudo reference picture in the reference view, and where the inter-time reference picture and the pseudo reference picture correspond to same time instance or same access unit.

One aspect of the present invention addresses the configuration of final residue formation. In one embodiment, the first residues are determined based on second differences between the current block and the inter-view reference block, final residues are generated from the first residues by predicting the first residues using the pseudo residues, and the encoding or decoding is applied to the final residues. In another embodiment, the inter-view reference block and the first pseudo residues are combined to form a combined predictor and final residues are generated from the current block by predicting the current block using the combined predictor. In yet another embodiment, the combined predictor is processed by clipping to form a clipped predictor, and the final residues are generated from the current block by predicting the current block using the clipped predictor. The pseudo residues may be processed using a linear function or a non-linear function before being used for encoding or decoding of the current block.

Another aspect of the present invention addresses determination of the pseudo reference region and the corresponding region. The pseudo reference region in the pseudo reference picture in the reference view can be located by using the DV based on the corresponding region in the inter-time reference picture in the current dependent view. The corresponding region within the inter-time reference picture in the current dependent view can be located by using an estimated MV (motion vector) based on the current block of the current picture in the current dependent view. The estimated MV can be derived based on previously coded spatial and temporal neighboring blocks of the current block. If a candidate MV associated with the spatial and temporal neighboring blocks of the current block refers to the inter-time reference picture in the current dependent view, the candidate MV is selected as the estimated MV. In one embodiment, an index associated with a candidate MV that is selected as the estimated MV can be transmitted in a MB (Macroblock) level, CU (Coding Unit) level or PU (Prediction Unit) level of a video bitstream. In another embodiment, an index associated with the candidate MV selected as the estimated MV can be determined implicitly at a decoder side.

The use of pseudo residues can be enabled or disabled for a slice, MB, CU or PU depending on an indication transmitted in a corresponding slice level, MB level, CU level or PU level of a video bitstream. The use of pseudo residues can be enabled or disabled implicitly for a slice, MB, CU or PU depending on a specific coding mode for the slice, MB, CU or PU. For example, the use of pseudo residues can be enabled for a slice, MB, CU or PU coded in Merge/Skip mode or can be enabled for the slice, MB, CU or PU using an inter-view Merge candidate in a temporal direction. Furthermore, other pseudo residues may be used, where derivation of the other pseudo residues is associated with a second inter-view reference picture in the reference view, and the first inter-view reference picture and the second inter-view reference picture are in different reference picture lists.

DETAILED DESCRIPTION

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention.

Reference throughout this specification to "one embodiment," "an embodiment," or similar language means that a particular feature, structure, or characteristic described in connection with the embodiment may be included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of apparatus and methods that are consistent with the invention as claimed herein.

Figure 1:
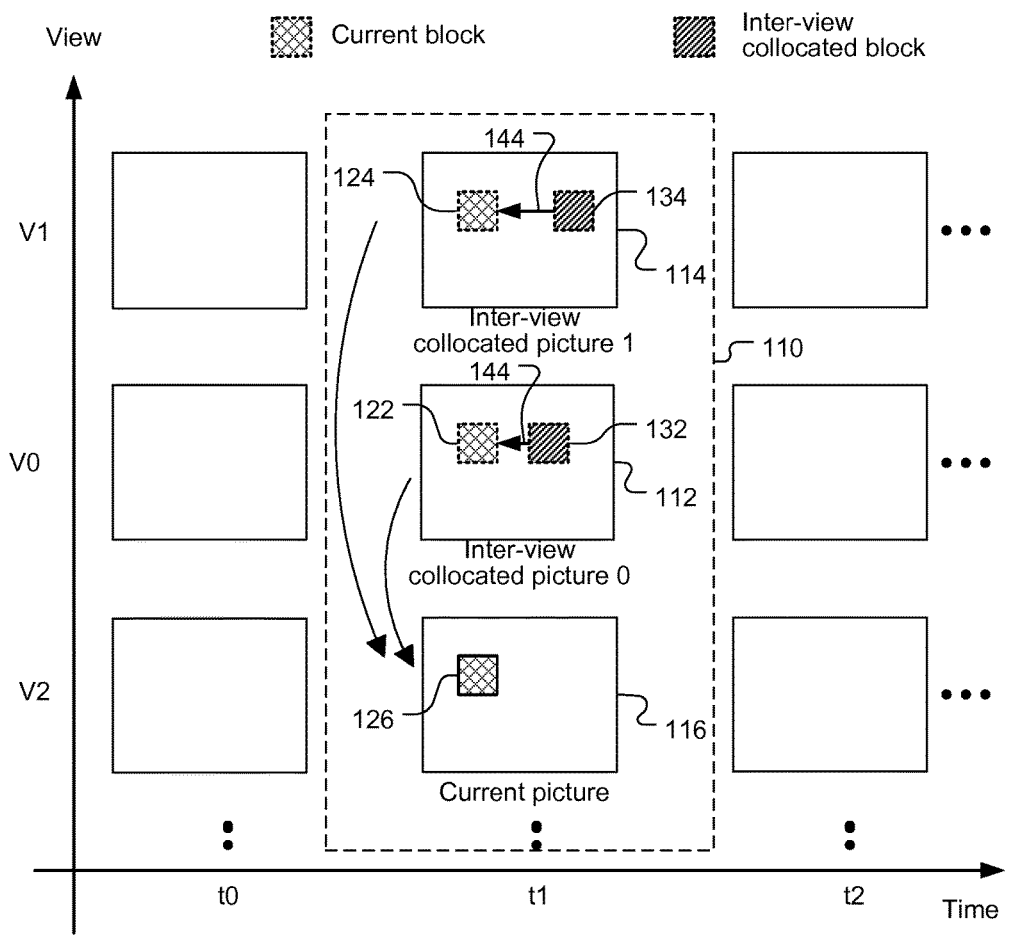
FIG. 1 illustrates an example of coding structure for a three-dimensional video coding system based on motion compensated prediction (MCP) and disparity compensated prediction (DCP).
Figure 2:
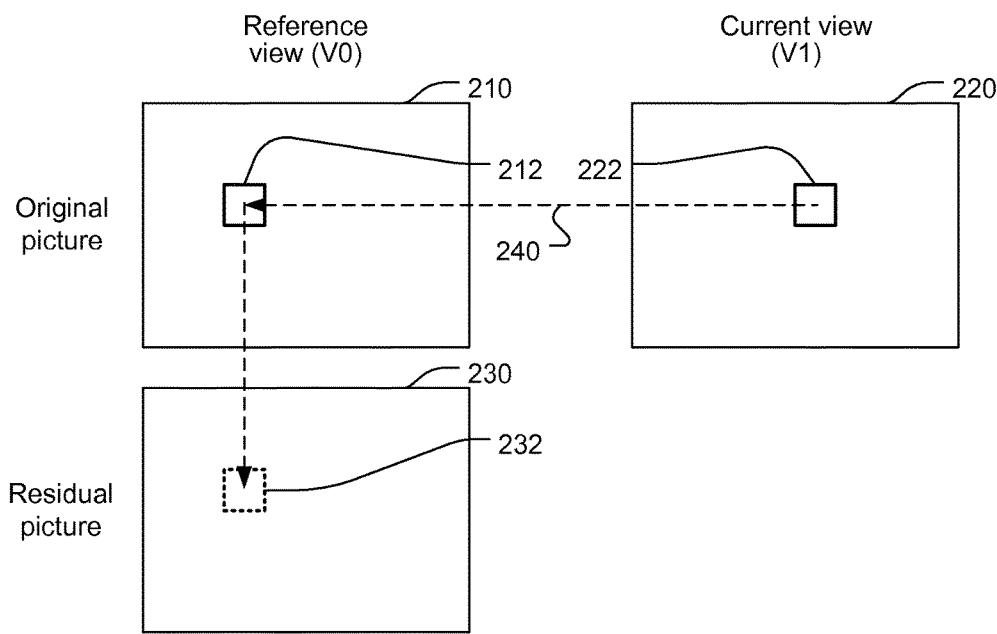
FIG. 2 illustrates the structure of inter-view residual prediction according to HEVC (High Efficiency Video Coding) based 3D video coding standard (3D-HEVC).
Figure 3:
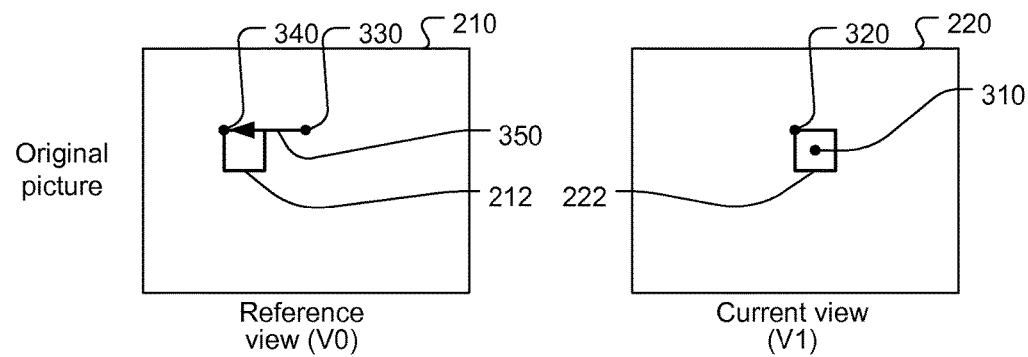
FIG. 3 illustrates an example of location derivation of the reference residual block according to 3D-HEVC.
Figure 4:
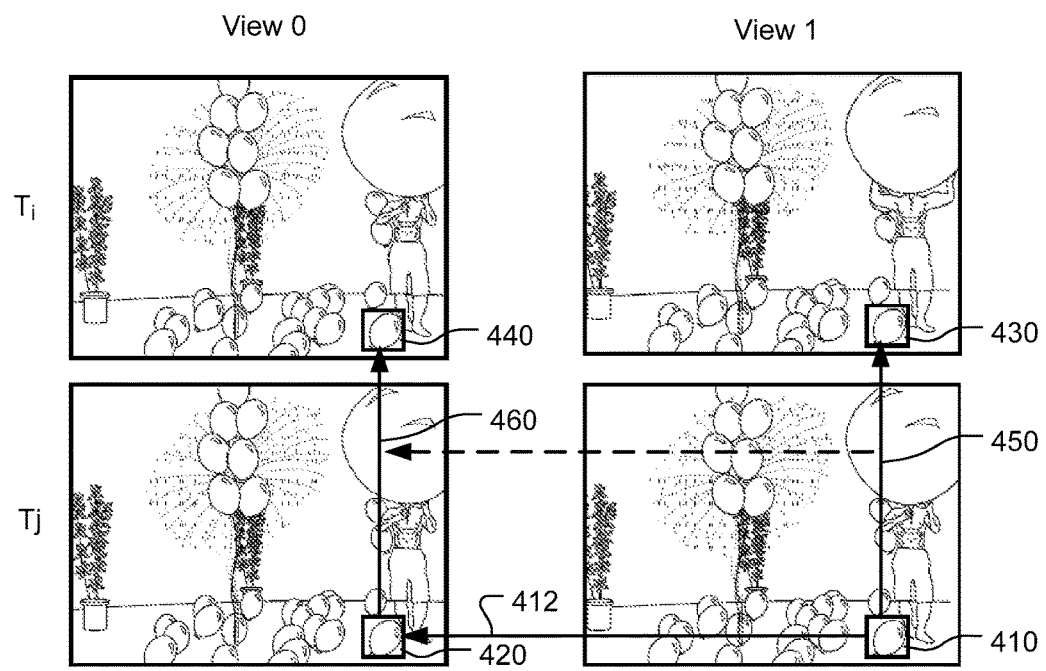
FIG. 4 illustrates an example of the prediction structure of ARP (advanced residual prediction) according to 3D-HEVC.
Figure 5:
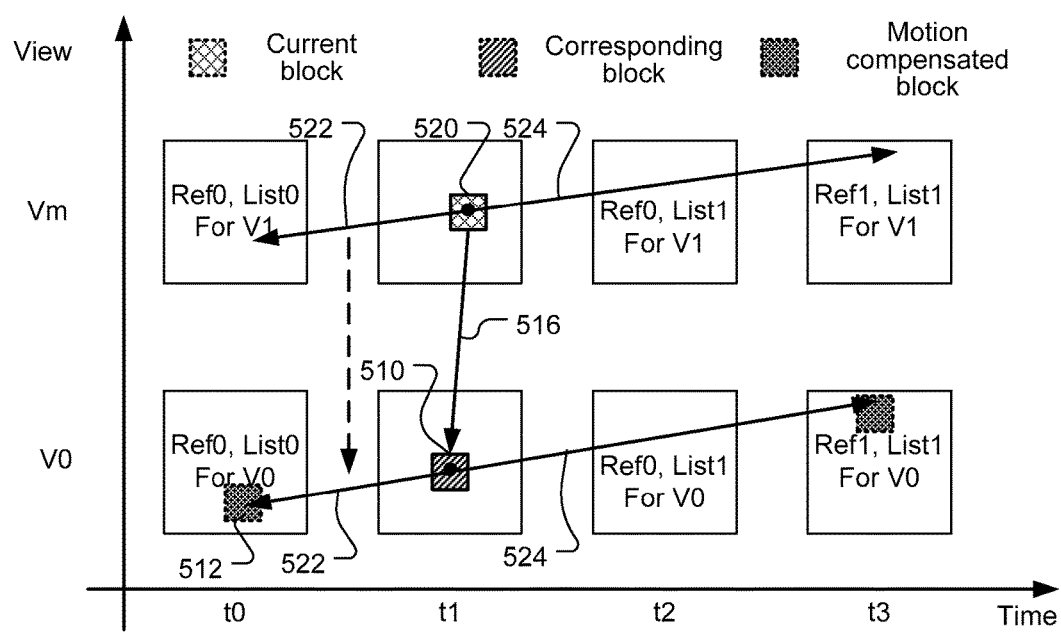
FIG. 5 illustrates the relationship among the current block, corresponding block and motion compensated block in ARP (advanced residual prediction) according to 3D-HEVC.
Figure 6:
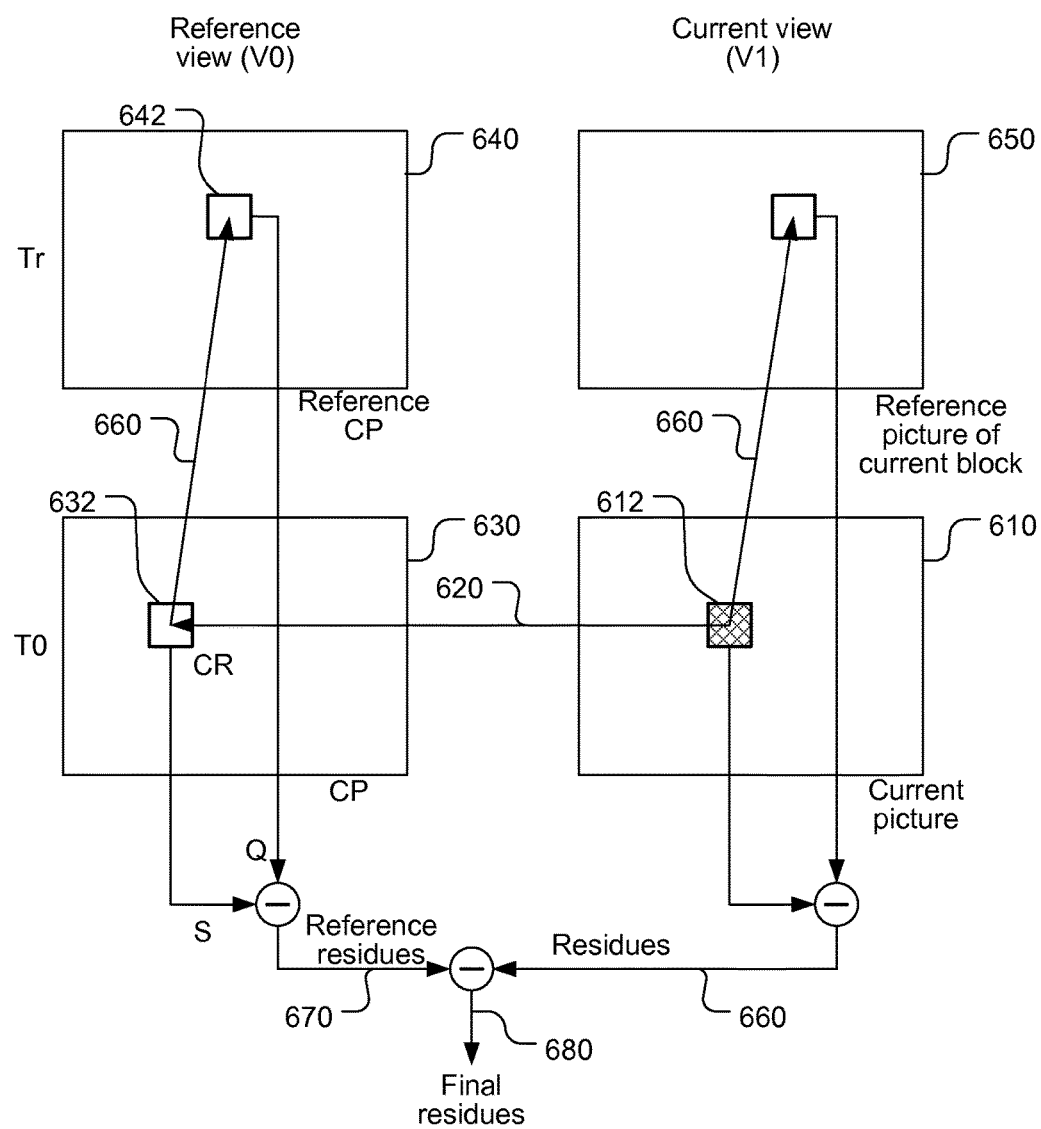
FIG. 6 illustrates a block diagram of residual prediction, where the current inter-time residues are predicted using reference inter-time residues according to 3D-HEVC.

In the disclosure, inter-time reference picture refers to the reference picture that is in the same view as the current picture, but the reference picture has a different POC (Picture Order Counts) or corresponds to different time instance from the current picture. FIG. 6 illustrates another perspective of inter-view residual prediction as disclosed in 3D-HEVC, where the residues (660) are predicted using reference residues (670) to form new residues (680). View 0 denotes the base view and view 1 denotes the dependent view. A current block (612) in a current picture (610) in view 1 is being coded. The procedure is described as follows.

1. An estimated DV (620) for the current block (612) referring to an inter-view reference is derived. This inter-view reference denoted as Corresponding Picture 630 (CP) is in the base view and has the same POC as that of the current picture in view 1. A Corresponding Region 632 (CR) in CP for the current block (612) in the current picture (610) is located according to the estimated DV (620). The reconstructed pixel in the CR (632) is noted as S.
2. Reference corresponding picture 640 in the base view with the same POC as that of the reference picture (650) for the current block (612) is found. The same MV (660) as that of the current block is used on CR to locate reference corresponding region 642 in the reference corresponding picture, whose relative displacement towards the current block is DV+MV. In another embodiment, reference corresponding picture 640 in the reference view with a different POC as one appointed reference picture (650) for the current picture (610) is found. The MV of the current block is scaled to the reference corresponding picture (640). The scaled MV is used on CR to locate reference corresponding region 642 in the reference corresponding picture, whose relative displacement towards the current block is DV+Scaled MV. The reconstructed image in the reference corresponding picture 640 is noted as Q.
3. The reference residues RR 670 is calculated as RR=S-Q. The operation here is sample-wised, i.e., RR[j,i]=S [j,i]-Q[j,i], where RR[j,i] is a sample in reference residues, S[j,i] is a sample in S, Q[j,i] is a sample in Q, and [j,i] is a relative position in the region. In the following descriptions, operations on a region are all sample-wise operations.
4. RR 670 will be used as the residual prediction for the current block to generate final residues (680).

Figure 7:
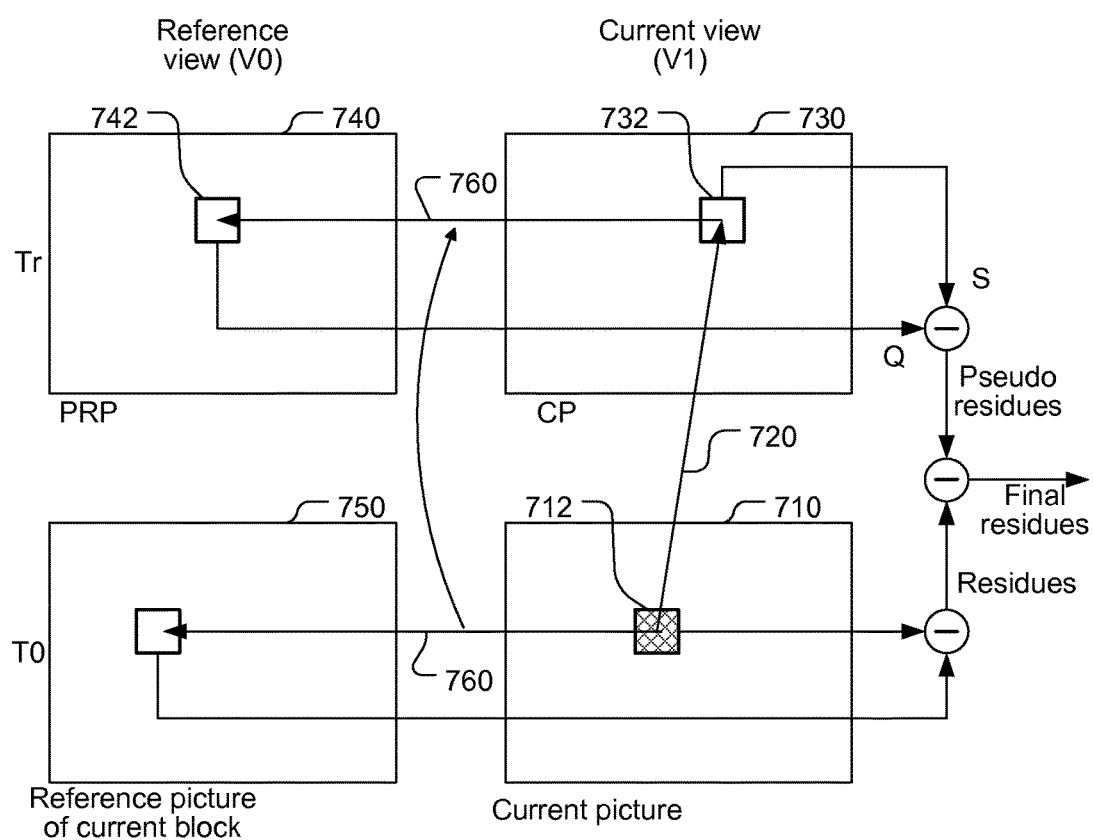
FIG. 7 illustrates a block diagram of residual prediction according an embodiment of the present invention, where the current inter-view residues are predicted using pseudo residues.

Embodiments of the present invention use pseudo residues as a predictor for the residues of a current block, where the current block is inter-view predicted and has a disparity vector to point to an inter-view reference picture. The pseudo residues can be generated for an inter block referring to an inter-time reference picture. Inter-view reference picture means that the reference picture and the current picture have the same POCs or correspond to same time instance but are in different views. FIG. 7 illustrates an exemplary inter-time residual prediction process according to an embodiment of the present invention. View 0 denotes a reference view such as the base view and view 1 denotes the dependent view. A current block (712) in a current picture (710) in view 1 is being coded. The procedure is described as follows.

1. An estimated MV (720) for the current block (712) referring to an inter-time reference is derived. This inter-time reference denoted as Corresponding Picture 730 (CP) is in view 1. A Corresponding Region 732 (CR) in CP is located for the current block using the estimated MV. The reconstructed image in the CR (732) is noted as S. The corresponding region may have the same image unit structure (e.g., Macroblock (MB), Prediction Unit (PU), Coding Unit (CU) or Transform Unit (TU)) as the current block. Nevertheless, the corresponding region may also have different image unit structure from the current block. The corresponding region may be larger or smaller than the current block. For example, the current block corresponds to a CU and the corresponding block corresponds to PU.
2. Pseudo reference picture 740 (PRP) in the reference view which has the same POC as that of CP in view 1 is found. The same DV (760) as that of the current block is used on CR 732 to locate Pseudo Reference Region 742 (PRR) in PRP, whose relative displacement towards the current block is MV+DV. The reconstructed image in the PRR (742) is noted as Q. Similarly, the pseudo reference region may have the same image unit structure as the current block or different image unit structure from the current block.
3. The pseudo residues PR are obtained as PR=S-Q.
4. PR will be used for encoding or decoding of the current block. For example, the PR can be used as the pseudo residual prediction for the current block to form the final residues.

Other forms of PR, such as f(PR), can be used for encoding or decoding of the current block, where f can be a linear or a non-linear function. For example, f(PR) can be a linear function represented by a*PR+b, where coefficients a and b can be transmitted explicitly from the encoder to decoder, or can be deduced implicitly in the same way both on the encoder and the decoder.

Pseudo residues can be generated for an inter block referring to more than one references picture. For example, in the case of a bi-prediction block, the block may be predicted using two predictions, $P_0$ and $P_1$, referring to reference picture $R_0$ and $R_1$ from $List_0$ and $List_1$ respectively. The average of the two predictions, i.e., $(P_0+P_1)/2$ can be used as the bi-prediction. Pseudo residues, $PR_x$ with x=0 or 1, can be obtained based on the pseudo residue derivation procedures described above. Depending on whether $R_x$ is an inter-time reference picture or an inter-view reference picture, a corresponding pseudo residue derivation procedure can be used. Then pseudo residues, PR for the bi-prediction case can be calculated according to $PR=(PR_0+PR_1)/2$ or $PR=(PR_0+PR_1+1)/2$.

Figure 8:
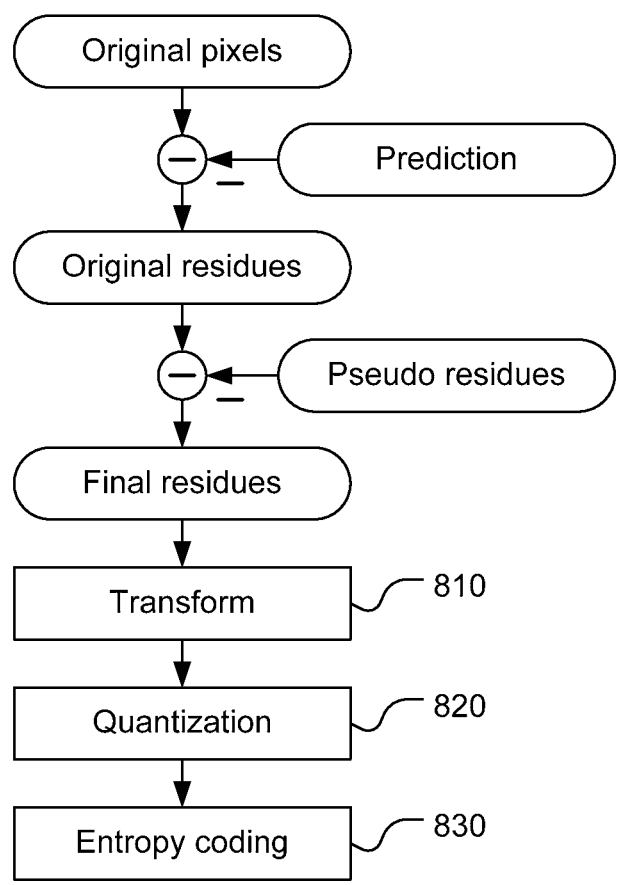
FIG. 8 illustrates an exemplary block diagram of residue construction and coding process at an encoder side.
Figure 9:
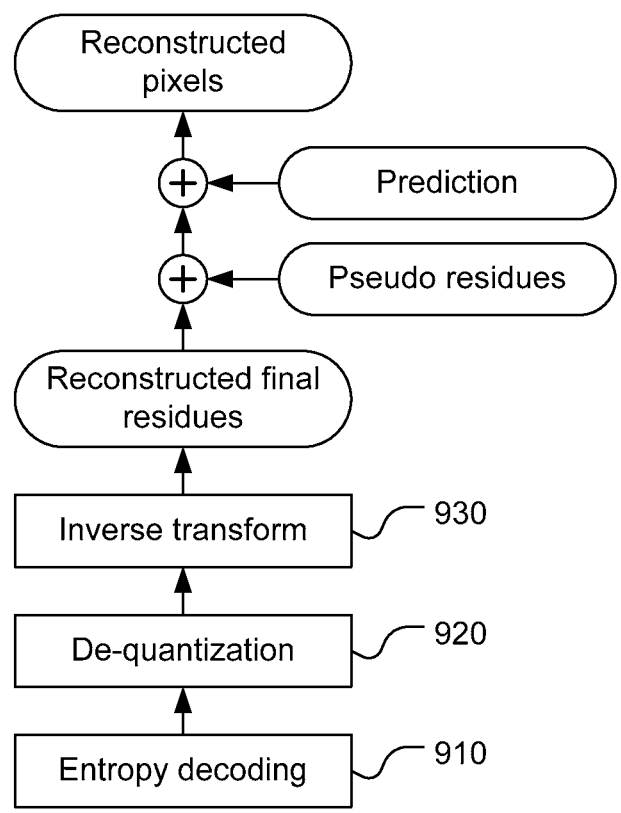
FIG. 9 illustrates an exemplary block diagram of residue reconstruction and decoding process at a decoder side.

Pseudo residues, PR can be used to predict the original residues OR. The final residues, FR can be calculated as FR=OR−PR. At the encoder side, the encoding processes such as transform (810), quantization (820) and entropy coding (830), are applied to FR instead of OR as depicted in FIG. 8. At the decoder side, the reconstructed FR, noted as FR', is obtained after entropy decoding (910), de-quantization (920) and inverse-transform (930). The reconstructed sample Y is then calculated as Y=FR'+PR+P, where P represents the prediction as depicted in FIG. 9.

Figure 10:
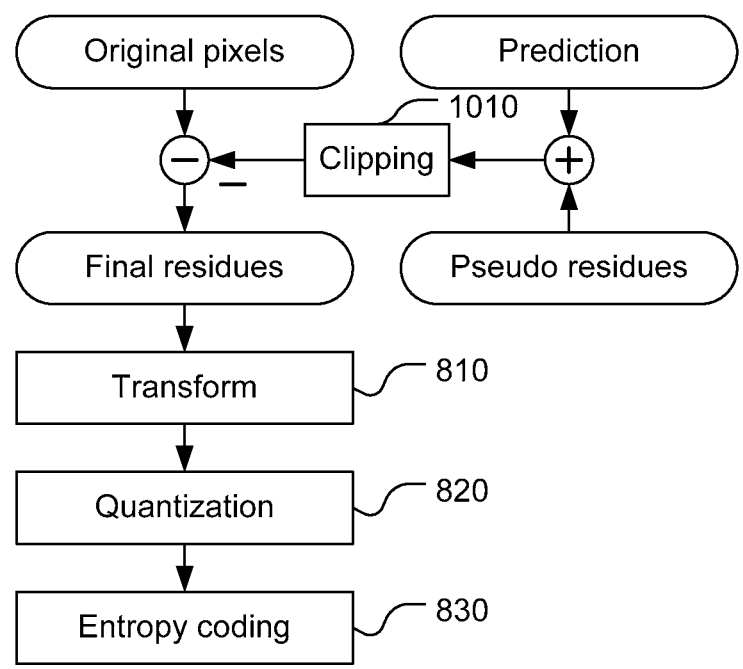
FIG. 10 illustrates an exemplary block diagram of alternative residue construction and coding process including clipping on output of combined prediction and pseudo residues at an encoder side.
Figure 11:
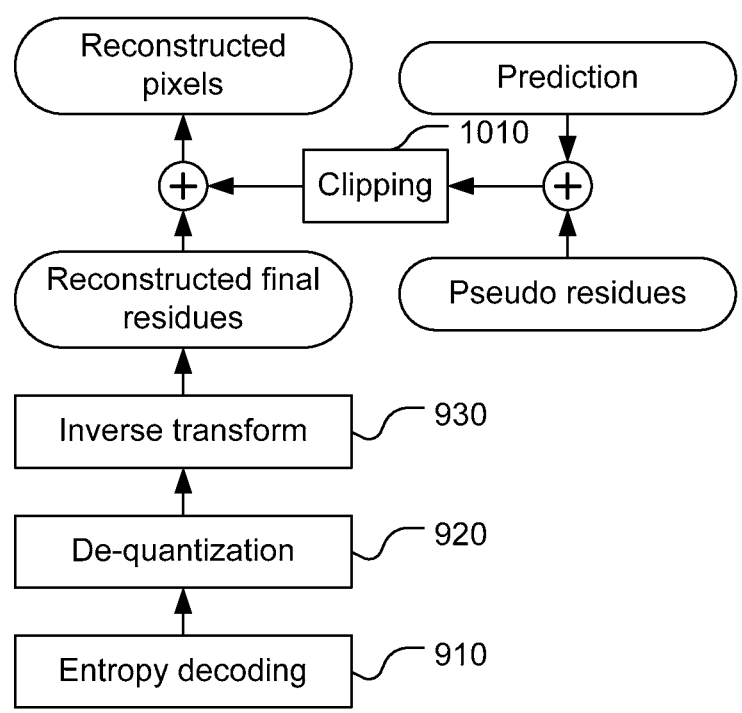
FIG. 11 illustrates an exemplary block diagram of alternative residue reconstruction and decoding process including clipping on output of combined prediction and pseudo residues at a decoder side.

The exemplary pseudo residue generation processes are intended for illustration. A person skilled in the art may alter the pseudo residue generation processes without departing from the spirit of present invention. For example, the process for the encoder side may be modified as shown in FIG. 10. Without clipping (1010), the process in FIG. 10 is equivalent to the process in FIG. 8 since FR=X−P−PR=X−(P+PR), where X corresponds to the original pixel. The combined result, i.e. (P+PR), is termed as combined prediction (ComP). The final residue, FR is calculated according to FR=X−ComP if clipping (1010) was not used. The combined prediction, i.e., ComP can be clipped into a range, [min_ value, max_ value], where min_ value and max_ value represent the minimal value and the maximal value of original samples respectively. At the decoder side, ComP is calculated and clipped the same way as in the encoder side as shown in FIG. 11. Then the reconstructed samples Y are calculated as Y=FR'+ComP, where FR' is the reconstructed FR. In addition, other forms of FP, such as f(FP) can replace the original FP to obtain FR and Y, where f can be a linear or nonlinear function. The function can be applied to FP before or after the clipping process (1010). For example, f(FP) can be a linear function represented by a*FP+b, where coefficients a and b can be transmitted explicitly from the encoder to decoder, or can be deduced implicitly in the same way both on the encoder and the decoder.

Figure 12:
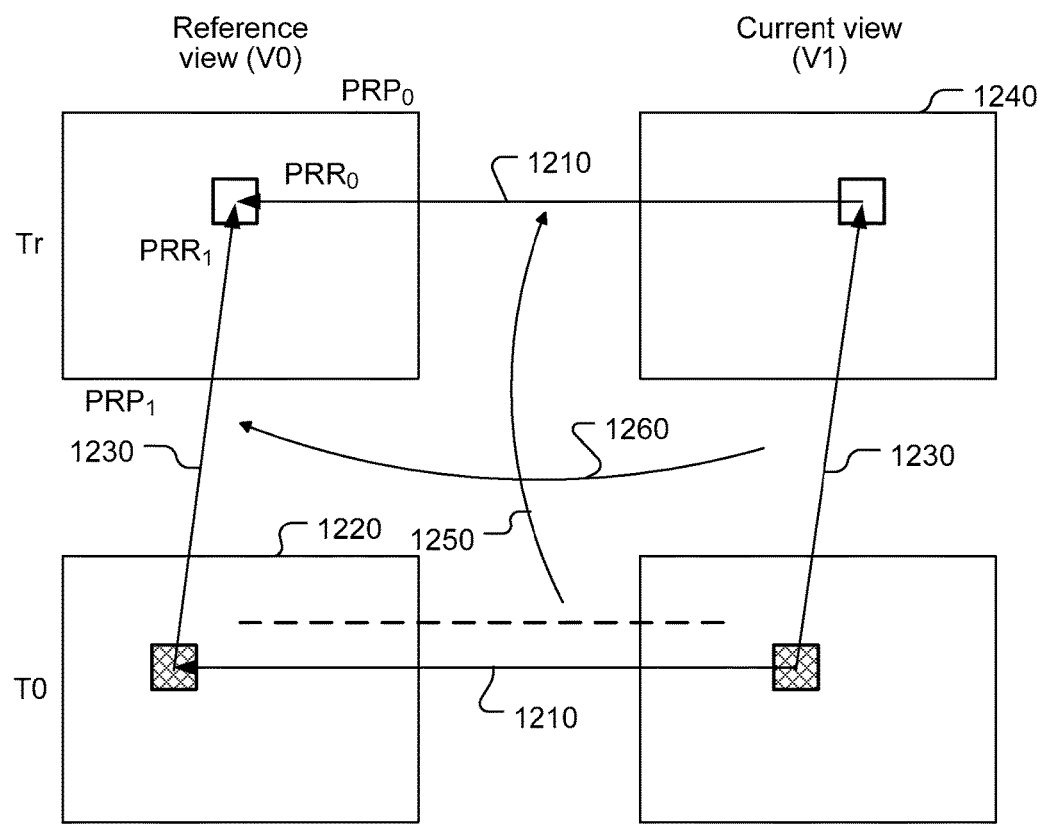
FIG. 12 illustrates a scenario where pseudo residues are used to predict the original residues when an inter block refers to both an inter-time reference picture and an inter-view reference picture.

A special case arises when an inter block refers to both an inter-time reference picture and an inter-view reference picture as shown in FIG. 12. In this case, the inter block has a current DV (1210) referring to an inter-view reference picture (1220) as well as a current MV (1230) referring to an inter-time reference picture (1240). Therefore, both the current DV (1210) and the current MV (1230) can be used in the pseudo residue generation procedures instead of the estimated DV/MV. For the inter-time prediction of inter-view residues, the pseudo reference picture and pseudo reference region, i.e., $PRP_0$ and $PRR_0$ can be obtained with the current inter-view reference picture (1220) and the current DV (1210) instead of the estimated DV. The pseudo prediction path is indicated by curved arrow 1250. On the other hand, for the inter-view prediction, the pseudo reference picture and pseudo reference region, i.e., $PRP_1$ and $PRR_1$ can be obtained with the current inter-time reference picture (1240) and the current MV (1230) instead of the estimated MV. The pseudo prediction path is indicated by dashed arrow 1260. It is obvious that $PRP_0$ and $PRP_1$ are the same picture, since they are both in the same base view as that of the current inter-view reference picture, and have the same POC as that of the current inter-time reference picture. Furthermore, $PRR_0$ and $PRR_1$ correspond to the same region since their relative displacements towards the current block are DV+MV and MV+DV respectively. Therefore, PRR is used to denote both of $PRR_0$ and $PRR_1$.

In the above case, the final residues (FR) can be calculated in a special way. The original sample of the current block is denoted as X. The reconstructed sample in the inter-view reference region is denoted as P. The reconstructed sample in the inter-time reference region is denoted as Q. The reconstructed sample in the PRR is denoted as S. The original residue is calculated as X−(P+Q)/2. The pseudo residue is derived as ((P−S)+(Q−S))/2. Accordingly, FR can be calculated as X−(P+Q)/2−((P−S)+(Q−S))/2, which equals to X−P−Q+S. According to one embodiment of the present invention, the new prediction (NP) is calculated as NP=P+ Q−S and the new residue (FR) can be calculated as FR=X− NP at the encoder side. Before calculating FR, NP can be clipped into the value range [min_value, max_value], where min_value and max_value represent the minimal value and the maximal value of original samples respectively. At the decoder side, NP is calculated and clipped the same way as that in the encoder side. The reconstructed sample, Y is then calculated as Y=FR'+NP, where NR' is the reconstructed FR.

There are several evaluation functions to obtain an estimated DV referring to an inter-view reference picture for inter-view residue prediction (e.g. the residual prediction process illustrated in FIG. 6) or an estimated MV referring to an inter-time reference picture for inter-time residue prediction (e.g. the residual prediction process illustrated in FIG. 7) including:

1. For inter-view residue prediction, spatial neighboring blocks and/or temporal neighboring blocks of the current block are checked one by one to determine whether they have a DV referring to an inter-view reference picture. The first DV found from the neighboring blocks is utilized as the estimated DV for the current block. For inter-time residue prediction, spatial neighboring blocks and/or temporal neighboring blocks of the current block are checked one by one to determine whether they have an MV referring to an inter-time reference picture. The first MV found from the neighboring blocks is utilized as the estimated MV for the current block.
2. Spatial neighboring blocks and/or temporal neighboring blocks of the current block are checked one by one to determine whether they have a DV/MV referring to an inter-view/inter-time reference picture. All or some of DVs/MVs from the neighboring blocks are utilized as candidates of the estimated DV/MV for the current block. The encoder can transmit an index of the chosen candidate to the decoder explicitly, or the decoder can derive the chosen candidate implicitly in the same way as the encoder. The index can be transmitted in Macroblock (MB), Coding Unit (CU) or Prediction Unit (PU).
3. The encoder can transmit the estimated DV/MV to the decoder explicitly. The estimated DV/MV can be transmitted in the Macroblock (MB), Coding Unit (CU) or Prediction Unit (PU). Since the vertical component of the estimated DV is always zero, the vertical component of the estimated DV need not to be transmitted in this case. The 'estimated DV' or 'estimated MV' obtained in method 1 or method 2 above can be utilized as a prediction for the derived DV/MV. Then only the difference between the estimated DV/MV and the prediction is transmitted.
4. The decoder can derive the estimated DV/MV implicitly. The 'estimated DV' or 'estimated MV' obtained in method 1 or method 2 above can be utilized as a hint for the derivation of the real estimated DV/MV.

Another method for an encoder to choose the estimated DV is as follows. For an estimated DV candidate (EDVC), its corresponding region (CR) can be located using the method as described previously. S corresponds to the original sample in the current block and R corresponds to the reconstructed sample in CR. An evaluating function E(S, R) can be defined. For each EDVC, its E(S, R) is calculated, and the EDVC with the minimum or maximum E(S, R) is chosen to be the estimated DV. For example, the evaluating function E(S, R) can be a SAD function defined as $$SAD(S, R) = \sum_j \sum_i |s_{i,j} - r_{i,j}|,$$

where $s_{i,j}$ and $r_{i,j}$ represent a sample at position (i, j) in S and R respectively. For each EDVC, the SAD(S, R) is calculated, and the EDVC with the minimum SAD(S, R) is chosen to be the estimated DV. The EDVCs may correspond to the neighboring blocks in method 2 of the estimated DV derivation as described above. The EDVCs may correspond to the explicitly transmitted DV in method 3 of the estimated DV derivation as described above. Since the vertical component of the estimated DV is always zero, the vertical component of the estimated DV need not to be transmitted in this case.

Figure 13:
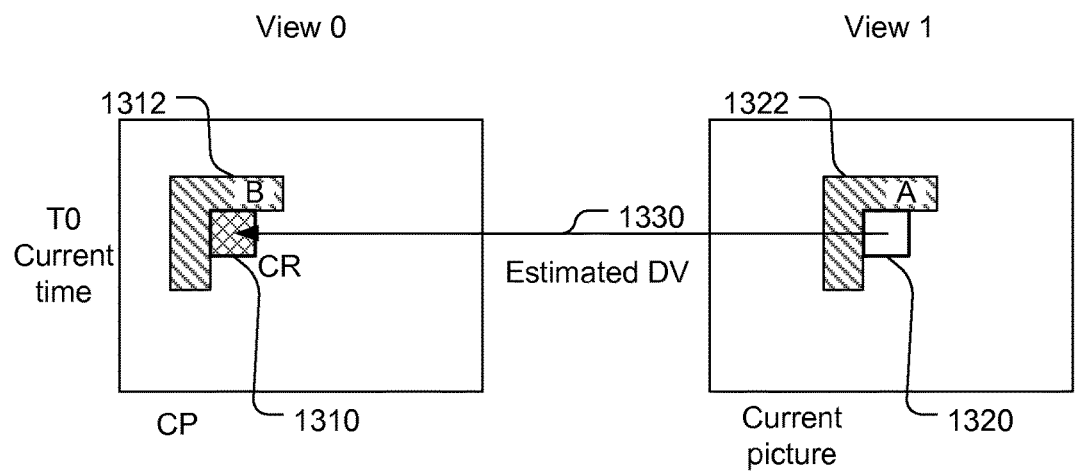
FIG. 13 illustrates the neighboring areas for the current block and the CR (corresponding region), denoted as A and B, for a decoder to derive the estimated DV.

Another way for a decoder to derive the estimated DV is as follows. For an EDVC, its corresponding region (CR, 1310) in a reference picture (1340) in view 0 is located based on the current block (1320) and the estimated DV (1330) as described previously. As shown in FIG. 13, the same neighboring areas are located for the current block (1320) and CR (1310), denoted as A (1322) and B (1312) respectively. Any neighboring reconstructed samples can be involved in this region, as long as areas A and B have the same shape relative to the current block and CR respectively. Let S be the reconstructed sample in A and R is the reconstructed sample in B. An evaluating function E(S, R) can be defined. For each EDVC, its E(S, R) is calculated, and the EDVC with the minimum or maximum E(S, R) is chosen to be the estimated DV. For example, the evaluating function E(S, R) can be a SAD function defined as $$SAD(S, R) = \sum_j \sum_i |s_{i,j} - r_{i,j}|,$$

where $s_{i,j}$ and $r_{i,j}$ represent a sample on position (i, j) in S and R respectively. For each EDVC, its SAD(S, R) is calculated, and the EDVC with the minimum SAD(S, R) is chosen to be the estimated DV. The EDVCs may correspond to the neighboring blocks in method 2 of the estimated DV derivation as described above. The EDVCs may correspond to the explicitly transmitted DV in method 3 of the estimated DV derivation as described above. Since the vertical component of the estimated DV is always zero, the vertical component of the estimated DV need not to be transmitted in this case.

There are also several methods to determine the inter-view reference picture which is referred by the estimated DV including:
1. The inter-view reference picture referred can be determined by spatial neighboring blocks and temporal neighboring blocks of the current block implicitly. An EDVC can refer to the same inter-view reference picture as the neighboring block. Hence, if this EDVC is chosen as the estimated DV, the inter-view reference picture referred is also chosen.
2. The inter-view reference picture referred can be pre-specified. The encoder and the decoder can use the same default picture, or the encoder can transmit related information to the decoder regarding which inter-view reference picture is referred by the estimated DV. This information can be incorporated in Sequence Parameter Set (SPS), View Parameter Set (VPS), Picture Parameter Set (PPS), Slice header (SH), Macroblock (MB), Coding Unit (CU) or Prediction Unit (PU). If the pre-specified inter-view reference picture is different from the inter-view reference picture referred by the neighboring block, the estimated DV or EDVC associated with this block must be scaled to the pre-specified inter-view reference picture.

One possible way for an encoder to choose the estimated MV for inter-time residue prediction is as follows. For an estimated MV Candidate (EMVC), the corresponding region (CR) is located based on the estimated MV candidate for the current block as described previously. Let S be the original samples in the current block and R be the reconstructed samples in CR. An evaluating function E(S, R) can be defined. For each EMVC, its E(S, R) is calculated, and the EMVC with the minimum or maximum E(S, R) is chosen to be the estimated MV. For example, the evaluating function E(S, R) can be a SAD function, $$SAD(S, R) = \sum_j \sum_i |s_{i,j} - r_{i,j}|,$$

where $s_{i,j}$ and $r_{i,j}$ represent a sample on position (i, j) in S and R respectively. For each EMVC, its SAD(S, R) is calculated, and the EMVC with the minimum SAD(S, R) is chosen to be the estimated MV. For the method 2 of estimated MV derivation mentioned above, EMVCs can be obtained from neighboring blocks. For the method 3 of estimated MV derivation mentioned above, EMVCs may include a portion or all the estimated MVs.

Figure 14:
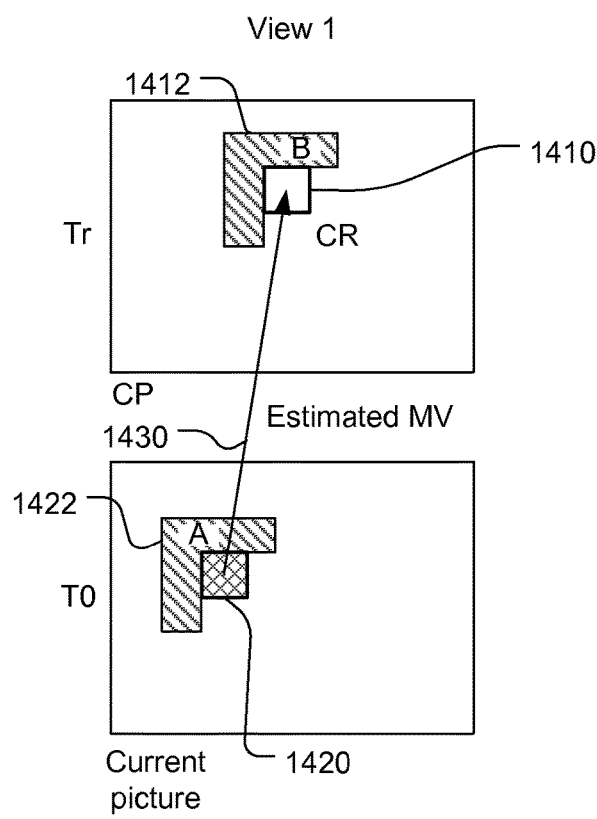
FIG. 14 illustrates the neighboring areas for the current block and the CR (corresponding region), denoted as A and B, for a decoder to derive the estimated MV.

Another method for a decoder to derive the estimated MV is described as follows. For an EMVC, its corresponding region (CR) is located based on the estimated MV candidate for the current block as described previously. The same neighboring areas are located for the current block (1420) and the corresponding region (CR, 1410) pointed by the estimated MV (1430), denoted as A (1422) and B (1412) respectively as shown in FIG. 14. Any neighboring reconstructed samples can be involved in this region, as long as areas A and B have the same shape relative to the current block and the CR respectively. Let S be the reconstructed samples in A and R be the reconstructed samples in B. An evaluating function E(S, R) can be defined. For each EMVC, its E(S, R) is calculated, and the EMVC with the minimum or maximum E(S, R) is chosen to be the estimated MV. For example, the evaluating function E(S, R) can be a SAD function, $$SAD(S, R) = \sum_j \sum_i |s_{i,j} - r_{i,j}|,$$

where $s_{i,j}$ and $r_{i,j}$ represent a sample on position (i, j) in S and R respectively. For each EMVC, its SAD(S, R) is calculated, and the EMVC with the minimum SAD(S, R) is chosen to be the estimated MV. For the method 2 for the estimated MV derivation mentioned above, EMVCs are obtained from neighboring blocks. For the method 3 for the estimated MV derivation mentioned above, EMVCs may include a portion or all the estimated MVs. The 'estimated MV' obtained according to the method 1 through method 3 for the estimated MV derivation mentioned above can be utilized to determine the range of EMVCs.

Yet another method for a decoder to derive the estimated MV is described as follows. For an EMVC, its CR is located as described in FIG. 7 and associated texts. The same neighboring sample regions for the current block and the CR are located, as denoted as A and B respectively, as shown in FIG. 14. Any neighboring reconstructed samples can be involved in this region, as long as sample regions A and B have the same shape relative to the current block and the CR respectively. Let S be the reconstructed samples in A and R be the reconstructed samples in B. An evaluating function E(S, R) can be defined. For each EMVC, its E(S, R) is calculated, and the EMVC with the minimum or maximum E(S, R) is chosen to be the estimated MV. For example, the evaluating function E(S, R) can be a SAD function, $$SAD(S, R) = \sum_j \sum_i |s_{i,j} - r_{i,j}|,$$

where $s_{i,j}$ and $r_{i,j}$ represent a sample on position (i, j) in S and R respectively. For each EMVC, its SAD(S, R) is calculated, and the EMVC with the minimum SAD(S, R) is chosen to be the estimated MV. For the method 2 for the estimated MV derivation mentioned above, EMVCs are obtained from neighboring blocks. For the method 3 for the estimated MV derivation mentioned above, EMVCs may include a portion or all the estimated MVs. The 'estimated MV' obtained according to the method 1 through method 3 for the estimated MV derivation mentioned above can be utilized to determine the range of EMVCs.

There are several methods to determine the inter-time reference picture, where the inter-time reference picture is referred by the estimated MV. These methods include:

1. The inter-time reference picture referred can be determined based on spatial neighboring blocks and temporal neighboring blocks of the current block implicitly. An EMVC can refer to the same inter-time reference picture as the neighboring block. Therefore, if this EMVC is chosen as the estimated MV, the inter-time reference picture referred is also chosen.
2. The inter-time reference picture referred can be pre-specified. The encoder and the decoder can accept the same default picture, or the encoder can transmit the related information to the decoder regarding which inter-time reference is referred by the estimated MV. This information can be in Sequence Parameter Set (SPS), View Parameter Set (VPS), Picture Parameter Set (PPS), Slice header (SH), Macroblock (MB), Coding Unit (CU) or Prediction Unit (PU). If the pre-specified inter-time reference picture is different from the inter-time reference picture referred by the neighboring block, the estimated MV or EMVC comes from this block must be scaled to the pre-specified inter-time reference picture.

The 'samples' discussed above may correspond to sub-sample locations (at sub-pixels) as well as integer sample locations (at integer pixels). Sub-samples can be obtained by interpolation. In addition, 'samples' can be chroma samples as well as luma samples.

In this disclosure, regions or blocks mentioned above, such as the corresponding region (CR), the pseudo reference region (PRR) and neighboring areas (e.g., A and B in FIG. 13 and FIG. 14), can be located at integer sample locations or sub-sample locations. If a region is located at sub-sample locations, they can be rounded to the nearest integer-sample locations. The integer-samples can be treated as samples from this region and be used in its subsequent process.

The pseudo residual prediction method can be used or not used in a slice, a Macroblock (MB), a Coding Unit (CU) or a Prediction Unit (PU). The encoder can transmit related information to the decoder to indicate whether the pseudo residual prediction method is used or not used in the slice, Macroblock (MB), Coding Unit (CU) or Prediction Unit (PU). In another embodiment, the pseudo residual prediction method can be used only for Macroblocks (MBs), Coding Units (CUs) or Prediction Units (PUs) associated with some specific coding mode or coding type. For example, the pseudo residual prediction method is always used for Macroblocks (MBs), Coding Units (CUs) or Prediction Units (PUs) coded in Merge or Skip mode only. In another embodiment, the pseudo residual prediction method is used for Macroblocks (MBs), Coding Units (CUs) or Prediction Units (PUs) coded using inter-view motion prediction and Merge/Skip mode only.

Figure 15:
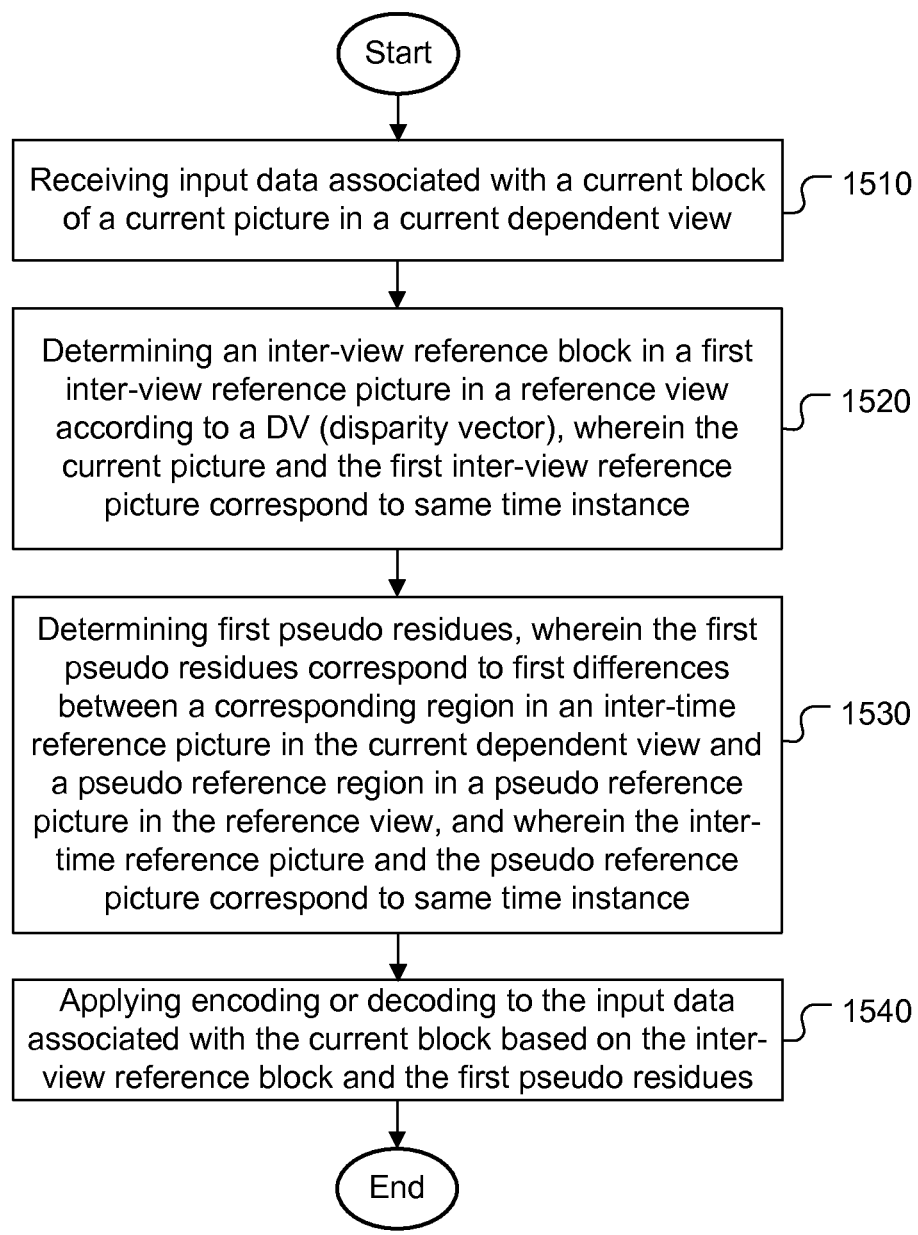
FIG. 15 illustrates an exemplary flowchart for a system incorporating residual prediction based on pseudo residues according to an embodiment of the present invention.

FIG. 15 illustrates an exemplary flowchart for a three-dimensional or multi-view video coding system according to an embodiment of the present invention. The system receives input data associated with a current block of a current picture in a current dependent view in step 1510. The input data may correspond to un-coded or coded texture data, depth data, or associated motion information. The input data may be retrieved from storage such as a computer memory, buffer (RAM or DRAM) or other media. The input data may also be received from a processor such as a controller, a central processing unit, a digital signal processor or electronic circuits that derives the input data. An inter-view reference block in a first inter-view reference picture in a reference view is determined according to a DV (disparity vector) as shown in step 1520, wherein the current picture and the first inter-view reference picture have a same current POC (Picture Order Count) or correspond to same time instance or same access unit. A first pseudo residues is determined in step 1530, wherein the first pseudo residues correspond to first differences between a corresponding region in an inter-time reference picture in the current dependent view and a pseudo reference region in a pseudo reference picture in the reference view, and wherein the inter-time reference picture and the pseudo reference picture have a same reference POC or correspond to same time instance or same access unit. Encoding or decoding is then applied to the input data associated with the current block based on the inter-view reference block and the first pseudo residues as shown step 1540.

The flowchart shown above is intended to illustrate an example of a three-dimensional or multi-view video coding system incorporating an embodiment of the present invention. A person skilled in the art may modify each step, re-arranges the steps, split a step, or combine steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

The pseudo residual prediction and DV or MV estimation methods described above can be used in a video encoder as well as in a video decoder. Embodiments of pseudo residual prediction methods according to the present invention as described above may be implemented in various hardware, software codes, or a combination of both. For example, an embodiment of the present invention can be a circuit integrated into a video compression chip or program codes integrated into video compression software to perform the processing described herein. An embodiment of the present invention may also be program codes to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware codes may be developed in different programming languages and different format or style. The software code may also be compiled for different target platform. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method for three-dimensional or multi-view video coding, the method comprising:
receiving input data associated with a current block of a current picture in a current dependent view;
determining an inter-view reference block in a first inter-view reference picture in a reference view according to a DV (disparity vector), wherein the current picture and the first inter-view reference picture correspond to same time instance;
determining first pseudo residues, wherein the first pseudo residues correspond to first differences between a corresponding region in an inter-time reference picture in the current dependent view and a pseudo reference region in a pseudo reference picture in the reference view, and wherein the inter-time reference picture and the pseudo reference picture correspond to same time instance; and
applying encoding or decoding to the input data associated with the current block based on the inter-view reference block and the first pseudo residues.

2. The method of claim 1, wherein first residues are determined based on second differences between the current block and the inter-view reference block, final residues are generated from the first residues by predicting the first residues using the first pseudo residues, and the encoding or decoding is applied to the final residues.

3. The method of claim 1, wherein the inter-view reference block and the first pseudo residues are combined to form a combined predictor, final residues are generated from the current block by predicting the current block using the combined predictor, and the encoding or decoding is applied to the final residues.

4. The method of claim 3, wherein the combined predictor is processed by clipping to form a clipped predictor and the final residues are generated from the current block by predicting the current block using the clipped predictor.

5. The method of claim 1, wherein the first pseudo residues are processed using a linear function or a non-linear function before said applying encoding or decoding to the input data associated with the current block based on the inter-view reference block and the first pseudo residues.

6. The method of claim 1, wherein the DV is used to locate the pseudo reference region in the pseudo reference picture in the reference view based on the corresponding region in the inter-time reference picture in the current dependent view.

7. The method of claim 1, wherein an estimated MV (Motion Vector) is used to locate the corresponding region within the inter-time reference picture in the current dependent view based on the current block of the current picture in the current dependent view.

8. The method of claim 7, wherein the estimated MV is derived based on previously coded spatial and temporal neighboring blocks of the current block, wherein if a candidate MV associated with the spatial and temporal neighboring blocks of the current block refers to the inter-time reference picture in the current dependent view, the candidate MV is selected as the estimated MV.

9. The method of claim 7, wherein the estimated MV is selected based on evaluation results of applying an evaluation function to a plurality of candidate MVs determined from MVs associated with neighboring blocks of the current block.

10. The method of claim 7, wherein an index associated with a candidate MV that is selected as the estimated MV is transmitted in a MB (Macroblock) level, CU (Coding Unit) level or PU (Prediction Unit) level of a video bitstream.

11. The method of claim 7, wherein an index associated with a candidate MV that is selected as the estimated MV is determined implicitly at a decoder side.

12. The method of claim 1, wherein said applying encoding or decoding to the input data associated with the current block based on the inter-view reference block and the first pseudo residues is enabled or disabled for a slice, MB (Macroblock), CU (Coding Unit) or PU (Prediction Unit) depending on an indication transmitted in a corresponding slice level, MB level, CU level or PU level of a video bitstream.

13. The method of claim 1, wherein said applying encoding or decoding to the input data associated with the current block based on the inter-view reference block and the first pseudo residues is enabled or disabled implicitly for a slice, MB (Macroblock), CU (Coding Unit) or PU (Prediction Unit) depending on a specific coding mode for the slice, MB, CU or PU.

14. The method of claim 1, wherein said applying encoding or decoding to the input data associated with the current block based on the inter-view reference block and the first pseudo residues is enabled for a slice, MB (Macroblock), CU (Coding Unit) or PU (Prediction Unit) coded in Merge/Skip mode or enabled for the slice, MB, CU or PU using an inter-view Merge candidate in a temporal direction.

15. The method of claim 1, wherein said applying encoding or decoding to the input data associated with the current block is further based on second pseudo residues, wherein derivation of the second pseudo residues is associated with a second inter-view reference picture in the reference view, and wherein the first inter-view reference picture and the second inter-view reference picture are in different reference picture lists.

16. An apparatus for three-dimensional or multi-view video coding, the apparatus comprising one or more electronic circuits, wherein said one or more electronic circuits are configured to:
receive input data associated with a current block of a current picture in a current dependent view;
determine an inter-view reference block in a first inter-view reference picture in a reference view according to a DV (disparity vector), wherein the current picture and the first inter-view reference picture correspond to same time instance;
determine pseudo residues, wherein the pseudo residues correspond to first differences between a corresponding region in an inter-time reference picture in the current dependent view and a pseudo reference region in a pseudo reference picture in the reference view, and wherein the inter-time reference picture and the pseudo reference picture correspond to same time instance; and apply encoding or decoding to the input data associated with the current block based on the inter-view reference block and the pseudo residues.

\* \* \* \* \*